(12) United States Patent
Dulebohn et al.

(10) Patent No.: US 6,410,077 B1
(45) Date of Patent: Jun. 25, 2002

(54) COMBINED MILK, JUICE, AND CEREAL GRAIN/POLYSACCHARIDE BLEND FOR CONSUMPTION AND METHOD FOR PRODUCTION THEREOF

(75) Inventors: Joel I. Dulebohn, Lansing; Ronald J. Carlotti, Grand Rapids; James A. Richter, Dexter, all of MI (US)

(73) Assignee: Michigan Biotechnology Institute, Lansing, MI (US)

(*) Notice: Subject to any disclaimer, the term of this patent is extended or adjusted under 35 U.S.C. 154(b) by 0 days.

(21) Appl. No.: 09/502,475

(22) Filed: Feb. 11, 2000

Related U.S. Application Data

(60) Provisional application No. 60/119,919, filed on Feb. 12, 1999, and provisional application No. 60/124,853, filed on Mar. 17, 1999.

(51) Int. Cl.$^7$ .............................. A23L 2/02; A23L 1/10; A23C 9/00
(52) U.S. Cl. ..................... 426/599; 426/548; 426/573; 426/580; 426/594; 426/618; 426/619; 426/620; 426/654
(58) Field of Search ................................ 426/599, 618, 426/619, 620, 580, 548, 654, 573

(56) References Cited

U.S. PATENT DOCUMENTS

| | | | |
|---|---|---|---|
| 4,031,264 A | | 6/1977 | Arolski et al. .............. 426/590 |
| 4,952,414 A | * | 8/1990 | Kaufman et al. ............. 426/93 |

FOREIGN PATENT DOCUMENTS

| | | |
|---|---|---|
| EP | 0 385 051 A | 9/1990 |
| EP | 0 521 707 A | 1/1993 |
| JP | 57 194748 A | 11/1982 |
| JP | 03 297370 A | 12/1991 |

OTHER PUBLICATIONS

"Texture, viscosity and stabilization," *Food Processing Solutions*, p. 58, 1999.

* cited by examiner

*Primary Examiner*—Helen Pratt
(74) *Attorney, Agent, or Firm*—Quarles & Brady LLP

(57) ABSTRACT

A stable mixture of milk, juice, and polysaccharide/cereal is disclosed. In a preferred version of the present invention, composition containing an amino acid, an organic or inorganic acid and a metal ion is added to further stabilize the milk proteins in the mixture.

20 Claims, No Drawings

COMBINED MILK, JUICE, AND CEREAL GRAIN/POLYSACCHARIDE BLEND FOR CONSUMPTION AND METHOD FOR PRODUCTION THEREOF

CROSS-REFERENCE TO RELATED APPLICATION

This application claims priority from U.S. Ser. No. 60/119,919, filed Feb. 12, 1999, and Ser. No. 60/124,853, filed Mar. 17, 1999. These provisional applications are incorporated by reference as if entirely set forth below.

STATEMENT REGARDING FEDERALLY SPONSORED RESEARCH OR DEVELOPMENT

Not applicable.

BACKGROUND

In the retail market, numerous products contain small amounts of ingredients such as milk, or other dairy derivatives; cereal, or other cereal grain derivatives; and juice, or other fruit/vegetable derivatives. In all the above mentioned products, usually only one or two of the three ingredients (from dairy, cereal, fruit or vegetable groups) may be characterizing ingredients, while third component is found near the end of the ingredient label, or listed as "less than 2% of the formula". Some examples of the above include the following generic retail products: cream of mushroom soup (including mushrooms, cornstarch, and whey protein concentrate), nacho cheese soup (including cheese, jalapeno peppers, and cornstarch), broccoli cheese soup (including broccoli, cheese, and wheat flour), bernaise sauce or hollandaise sauce (including cream, modified food starch, and lemon concentrate), light yogurt with fruit juice (including milk, modified corn starch, and various fruit juices).

Needed in the art is an improved beverage combining a milk compound, a juice compound, and a cereal/polysaccharide compound.

SUMMARY OF THE INVENTION

In one embodiment, the present invention is a stable mixture of milk, juice and either polysaccharide, cereal, or a combination of polysaccharide and cereal. In a preferred version of the present invention, the cereal has been milled to pass through an 80 mesh screen. In another preferred version of the present invention, the range of the milk component is from 20% to 80%, the range of the juice component is between 20% and 80%, and the preferred portion of the cereal or polysaccharide component is 3% to 30%. (All ranges are w/w.)

In another preferred embodiment of the present invention, SUCRELESSE is added as an agent to further stabilize the milk proteins in the mixture.

It is an object of the present invention to provide a stable, drinkable mixture of milk, juice and cereal or polysaccharide.

Other examples, features, and objects of the present invention will become apparent to one of skill in the art after examination of the specification and claims.

DESCRIPTION OF THE INVENTION

The present invention is a stable mixture that is a combination of milk, juice and a polysaccharide or cereals. By "stable mixture" we mean a beverage containing a mixture which does not physically separate for at least 1 week, preferably 2 weeks, stored at refrigerator or ambient temperature nor form any sedimentation on the bottom of the container nor form a watery supernatant near the surface nor any other kind of separation apparent to the naked eye. In preparing the stable mixture, it is preferred to protect the product against microbiological contamination by any of the various methods currently used by dairies or juice processors, at least by pasteurization.

In a preferred version of the present invention, the milk mixture is created from a combination of milk or milk products and fruit or vegetable drinks. Preferred juices include orange juice, lemon juice, lime juice, grape juice, pear juice, pineapple juice, apple juice and mixtures of these juices. Juice drinks, such as lemonade, orangeade, etc. and fruit juice-containing products, such as jams and jellies, are also suitable.

In another embodiment of the present invention, the mixture is created from a combination of milk and vegetable juices or vegetable products or created from milk and mixed vegetable and fruit juices or products.

The present invention is designed to work with a variety of milk or milk products. "Milk products" include fermented milk such as yogurt, cheese, cottage cheese, cream, and mixture of cream and milk, but it is not limited to these products. For example, a mixed yogurt and fruit mixture is specifically envisioned.

A preferable cereal grain is rice cereal. One can also use other raw or processed cooked grains, such as corn and wheat. We envision that the polysaccharide may be any gum, such as xanthan gum and carrageenan gum, or an alginate or a pectin. There are other examples of suitable polysaccharides. We specifically envision that a combination of grains and polysaccharides might be suitable.

A particularly advantageous proportion of grain or cereal is between 3–30% solids, w/w. In a preferred version of the present invention, the raw or processed cooked grain or cereal is milled to pass any mesh size between 42 to 250 mesh with the preferred range between 60 to 150 mesh.

Preferably, the mixture is suitable for drinking.

In another embodiment, the present invention is the use of SUCRELESSE as an agent to stabilize milk proteins in the emulsion of milk, juice and grain/polysaccharide. SUCRELESSE is described in more detail in U.S. Pat. No. 5,766,636, Edible, Low Calorie Compositions of a Carrier and an Active Ingredient and Methods for Preparation Thereof.

The SUCRELESSE stabilizes the milk proteins by binding them and preventing precipitation in the more acidic environment of the fruit juice drink. SUCRELESSE is a composition comprising an amino acid, an organic acid or inorganic acid, and a metal ion. Most preferably, SUCRELESSE has carboxylic acids, hydroxyl, amine functional groups and metal ions to bind the milk protein and the fiber in the grains. The SUCRELESSE also permits pasteurization by HTST (High Temperature Short Time), UHT (Ultra High Temperature), retort and pasteurization processing without the risk of separation during those processes.

The SUCRELESSE helps to form stable mixtures by varying the specific gravity of the SUCRELESSE. The specific gravity of SUCRELESSE can vary from 1.0 to 1.5 gm/ml; the typical value varies from 1.2 to 1.3 gm/ml. The gravity of milk and milk products and juice can be brought closer together thus adjusting the final specific gravity. The addition of SUCRELESSE is important to maintain the milk mixture in a pH range of, preferably, pH 3.0 to pH 7.0. In another embodiment of the invention, the pH range is higher, up to pH 8.5.

SUCRELESSE is a mixture of amino acids, metal ions source (such as Group IA, IIA, Ti, V, Cr, Mn, Fe, Co, Ni, Cu, Zn, and Fe), organic acids and inorganic acids.

Typically, the organic acids are mono-, di-, tri-, poly-carboxylic acids and may contain other functional groups such as $NH_2^-$, $OH^-$, $PO_4^{-3}$ and $SO_4^{-2}$. Typically, the inorganic acids are hydrochloric acid, sulfuric acid and phosphoric acid.

The molar ratio of metal ion:amino acid:acid can vary depending on the applications. The molar ratio of amino acid to metal ion can vary from 0.1 to 20. The organic or inorganic acids to metal ion molar ratio can vary from 0.1 to 20. The most common molar ratio for food application is amino acid varying from 0.1 to 4, and the organic or inorganic acid varying from 0.1 to 4. These molar ratios keep the SUCRELESSE in the pH range of 3–8, where most of the food applications are.

The ranges of suitable concentrations for SUCRELESSE are preferably 0.001% to 3% of a 65% solution (w/w). Preferably, 65 gm of SUCRELESSE is added to 35 gm of water and this is added to the mixture at 0.001% (10 µl/L of mixture) or to 3% (3 ml per 100 ml of mixture).

The present invention demonstrates a method of producing a homogeneous mixture, maintained by using SUCRELESSE as the mechanism for maintaining the mixture.

Preferably, the stable mixture is prepared as follows: Blend SUCRELESSE in the range of 0.1% to 2% in any of the following milks (fat-free, low fat, or whole milk) in a food blender, such as a Hamilton Beach 10 Blend Master, on stir setting for a few seconds. The percentage of milk is from 20% to 80%. Blend in reconstituted orange juice (from frozen concentrate) on a stir setting for a few seconds. The orange juice range is from 20% to 80%. Then add the rice cereal that was ground, which was screened through a mesh ranging between 42 to 250 mesh, with the preferred range between 60 to 150 mesh. One can also use raw rice, corn, wheat, or oat grain in the same mesh size. The percentage of rice cereal is from 3% to 30%. Stir in the blender for a few seconds; then change the setting to liquefy, and liquefy the mixture for about one minute. Pasteurize the samples in the microwave to 85° C., place the mixture in sterilized containers to be immediately hot-sealed thus creating a partial vacuum. Let the mixture cool to room temperature and store in the refrigerator. The pH of the drink was 4.33. The pH range of the mixture can be from 3.5 to 7.0. The preferred range is from 4.0 to 6.0. One can sterilize the mixture by conventional heating, induction, solar conduction, and direct electrical resistance methods.

The preferred range of SUCRELESSE is from 0.1% to 2%. The preferred range of milk is from 35% to 70%. The preferred range of juice is 20% to 60%. Sugar can be added to the mixture in the preferred range from 1% to 8%. The preferred mesh size for the cereal is between 60 mesh to 150 mesh. The preferred range of grain or cereal is 5% to 12%.

The most preferred range is described below in Example (3)(B), 54% milk and 35% juice. These ranges can include 50% to 60% milk and 30% to 40% juice.

EXAMPLES

1. Combination Milk, Juice and Rice Drink

Below is an example of a typical combination milk and rice drink of the present invention:

Add 144 ml of reconstituted orange juice (from frozen concentrate) to 96 ml of low fat milk and blend on stir setting for a few seconds. Then add 17.4 gm of rice cereal that was ground and passed through an 80 mesh screen. Stir in the blender for a few seconds. Change the setting to liquefy, and liquefy the mixture for about one minute. Pasteurize the samples in the microwave to 85° C., place the mixture in sterilized jars, and let cool to room temperature. Store the jars in the refrigerator. The pH of the drink was 4.33.

2. Preparation of SUCRELESSE

Below is a preferred preparation of SUCRELESSE:

1571.5 grams of water 1155.1 grams of lysine $H_2O$ (7.03 moles)

189.1 grams of magnesium oxide (4.69 moles)

1365.1 grams of malic acid (10.18 moles)

654.5 grams of citric acid anhydrous (3.41 moles)

The pH of the solution varies from 3.5 to 3.9 and is approximately a 65% solid solution.

The ratio of lysine $H_2O$:metal:organic acids is 1.5:1:2.9

3. Combination Milk, Rice, Juice and SUCRELESSE Drinks (A) Blend 2.76 grams of SUCRELESSE in 672 grams of fat-free milk in a food blender (Hamilton Beach 10 Blend Master) on stir setting for a few seconds. Blend in 336 grams of reconstituted orange juice (from frozen concentrate) on a stir setting for a few seconds. Then add 102 grams of rice cereal which passed through an 80 mesh screen. Stir in the blender for a few seconds then change the setting to liquefy, and liquefy the mixture for about one minute. Pasteurize the samples in the microwave to 8520 C., place the mixture in sterilized containers, which will seal under a vacuum. Let the mixture cool to room temperature and store in the refrigerator.

(B) Blend 2.5 grams of SUCRELESSE in 575.75 grams of fat-free milk in a food blender (Hamilton Beach 10 Blend Master) on stir setting for a few seconds. Then add 78.58 grams of rice cereal which passed through an 80 mesh screen. Blend for a few seconds then add 42.5 grams of sugar. Blend in 383 grams of reconstituted orange juice pulp free (from frozen concentrate) on a stir setting for a few seconds. Add 0.6 gram of mango flavor. Stir in the blender for a few seconds; then change the setting to liquefy, and liquefy the mixture for about one minute. Pasteurize the samples in the microwave to 85° C., place the mixture in sterilized containers, which will seal under a vacuum. Let the mixture cool to room temperature and store in the refrigerator.

(C) Blend 2.5 grams of SUCRELESSE in 575.75 grams of fat-free milk in a food blender (Hamilton Beach 10 Blend Master) on stir setting for a few seconds. Then add 78.58 grams of rice cereal which passed through an 80 mesh screen. Blend for a few minutes then add 42.5 grams of sugar. Blend in 383 grams of reconstituted orange juice pulp free (from frozen concentrate) on a stir setting for a few seconds. Stir in the blender for a few seconds then change the setting to liquefy, and liquefy the mixture for about one minute. Pasteurize the samples in the microwave to 85° C., place the mixture in sterilized containers, which will seal under a vacuum. Let the mixture cool to room temperature and store in the refrigerator.

(D) Blend 2.5 grams of SUCRELESSE in 600 grams of fat free milk in a food blender (Hamilton Beach 10 Blend Master) on stir setting for a few seconds. Blend for a few minutes then add 78.58 grams of honey-nut oat cereal, which passed through an 80 mesh screen. Blend in 383 grams of reconstituted apple juice (from frozen concentrate) on a stir setting for a few seconds. Then add 21 grams of sugar. Stir in the blender for a few seconds; then change the setting to liquefy, and liquefy the mixture for about one minute. Pasteurize the samples in the microwave to 85° C., place the mixture in sterilized containers, which will seal under a vacuum. Let the mixture cool to room temperature and store in the refrigerator.

(E) Blend 2.5 grams of SUCRELESSE in 575.75 grams of skim milk in a food blender (Hamilton Beach 10 Blend Master) on stir setting for a few seconds. Then add 78.53 grams of rice flour. Blend in 383 grams of reconstituted orange juice (from frozen concentrate) on a stir setting for a few seconds. Blend for a few minutes then add 62.5 grams of sugar. Blend for a few minutes then add 62.5 grams of sugar. Add 0.6 gram of mango flavor. Stir in the blender for a few seconds; then change the setting to liquefy, and liquefy the mixture for about one minute. Pasteurize the samples in the microwave to 85° C., place the mixture in sterilized containers, which will seal under a vacuum. Let the mixture cool to room temperature and store in the refrigerator.

(F) Blend 2.76 grams of SUCRELESSE in 672 grams of fat-free milk in a food blender (Hamilton Beach 10 Blend Master) on stir setting for a few seconds. Blend in 336 grams of reconstituted orange juice pulp free (from frozen concentrate) on a stir setting for a few seconds. Then add 102 grams of corn cereal which passed through an 80 mesh screen. Stir in the blender for a few seconds; then change the setting to liquefy, and liquefy the mixture for about one minute. Pasteurize the samples in the microwave to 85° C., place the mixture in sterilized containers, which will seal under a vacuum. Let the mixture cool to room temperature and store in the refrigerator.

We claim:

1. A mixture comprising a milk component; a juice component, a polysaccharide or cereal component selected from the group consisting of polysaccharides, cereals, and combinations of polysaccharides and cereals; and a composition comprising an amino acid, an organic or inorganic acid, and a metal ion, wherein the mixture is a stable mixture.

2. The mixture of claim 1, wherein the milk component is selected from the group consisting of fermented milk, yogurt, cheese, cottage cheese, cream, skim milk, and whole milk.

3. The mixture of claim 1, wherein the juice component is selected from the group consisting of fruit and vegetable juices.

4. The mixture of claim 1 wherein the juice component is selected from the group consisting of apple, orange, pineapple, cherry, grape, grapefruit, lemon, melon, strawberry, black cherry, lemon-lime, mango, papaya, cranapple, fruit punch, peach, guava, tangerine, apricot, and cranberry.

5. The mixture of claim 1 wherein the juice component is selected from a juice drink.

6. The mixture of claim 5 wherein the juice drink is selected from the group consisting of lemonade and orange-ade.

7. The mixture of claim 1 wherein the juice component is selected from the group consisting of jams and jellies.

8. The mixture of claim 1 wherein the polysaccharide or cereal component is a cereal milled to pass through an 80 mesh sieve screen.

9. The mixture of claim 1 wherein the polysaccharide or cereal component is a cereal milled to pass through a sieve screen between 42 to 250 mesh.

10. The mixture of claim 9 wherein the polysaccharide or cereal component is rice cereal milled to pass through a sieve screen between 60 mesh and 150 mesh.

11. The mixture of claim 1 wherein:
the milk component is between 20% and 80% (w/w).

12. The mixture of claim 1 wherein;
the juice component is between 20% and 80% (w/w).

13. The mixture of claim 1 wherein:
the polysaccharide or cereal component is between 3% and 30% (w/w).

14. The mixture of claim 1 wherein:
the composition comprising an amino acid, an organic acid or inorganic acid, and a metal ion is between 0.001 and 3% (w/w).

15. The mixture of claim 1 further comprising sugar.

16. The mixture of claim 1 further comprising:
sugar in the range from 1 % to 8% (w/w).

17. The mixture of claim 1 wherein:
the polysaccharide or cereal component is selected from rice cereal, corn cereal and wheat cereal.

18. The mixture of claim 1 wherein:
the composition comprising an amino acid, an organic acid or inorganic acid, and a metal ion is a solution comprising water, lysine $H_2O$, magnesium oxide, malic acid, and citric acid.

19. A mixture comprising:
a milk component in the range of 35% to 70% (w/w);
a juice component in the range of 20% to 60% (w/w);
a polysaccharide or cereal component selected from the group consisting of polysaccharides, cereals, and combinations of polysaccharides and cereals, the polysaccharide or cereal component being in the range of 5% to 12% (w/w); and
a composition comprising an amino acid, an organic or inorganic acid, and a metal ion, the composition being the range of 0.1% to 2% (w/w),
wherein the mixture is a stable mixture.

20. The mixture of claim 19 further comprising:
sugar in the range from 1% to 8% (w/w).

* * * * *